F. C. HOLTZ
Aug. 4, 1931.
Re. 18,145
MOTOR
Original Filed May 25, 1925
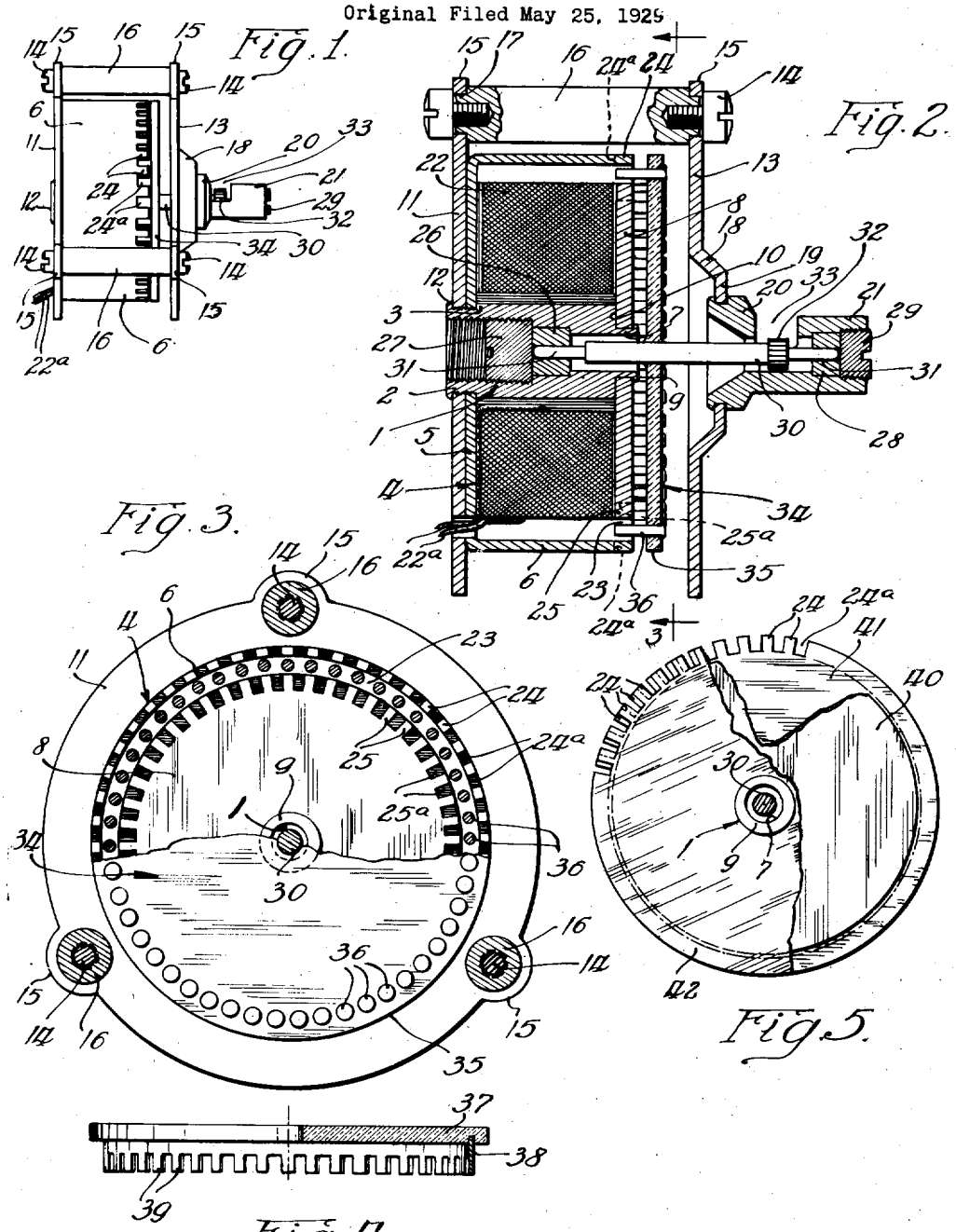
Inventor:
Frederick C. Holtz.
By Brown, Jackson, Boettcher & Dienner.
Attys.

Reissued Aug. 4, 1931

Re. 18,145

UNITED STATES PATENT OFFICE

FREDERICK C. HOLTZ, OF SPRINGFIELD, ILLINOIS, ASSIGNOR TO SANGAMO ELECTRIC CO., OF SPRINGFIELD, ILLINOIS, A CORPORATION OF ILLINOIS

MOTOR

Original No. 1,747,870, dated February 18, 1930, Serial No. 365,857, filed May 25, 1929. Application for reissue filed November 15, 1930. Serial No. 496,028.

This invention relates to alternating current electric motors, and more particularly to motors of the reaction type.

One of the main objects of my invention is to provide a relatively small synchronous motor of the reaction type particularly adapted for driving the mechanism of clocks, demand registers, or similar devices. A further object is to provide a motor of this type of comparatively simple and inexpensive construction, which is rugged and compact, has low synchronous speeds, and in which the torque per watt in-put is high. Another object is to provide a motor of this character in which the stresses in the rotor are balanced, thus eliminating noise due to vibration and producing a motor which is noiseless, or practically so, in its operation, a necessary characteristic of motors to be used for winding clocks and like purposes.

Further objects and advantages of my invention will appear from the detail description.

In the drawings:

Figure 1 is a side view of a motor constructed in accordance with my invention;

Figure 2 is a vertical sectional view through the motor in the plane of the axis thereof, parts being shown in elevation, on an enlarged scale;

Figure 3 is a section taken substantially on line 3—3 of Figure 2, the rotor being partly broken away;

Figure 4 is a detail edge view, partly in section, of a modified form of rotor;

Figure 5 is an outer face view, partly broken away, of a modified form of stator.

A motor constructed in accordance with my invention comprises a cylindrical stator, a coil within the stator, the stator being provided with an annular air gap in the magnetic circuit thereof, and a rotor having magnetic elements projecting into the air gap. In the particular construction illustrated, by way of example, I provide a tubular core 1 of magnetic material, such as soft iron or highly magnetic steel. This core is reduced at one end to provide a neck 2 and a shoulder 3 at the inner end thereof. A cup shaped casing 4, which is also of magnetic material, such as soft iron or highly magnetic steel, has its head 5 fitted upon the neck 2 and seating upon shoulder 3. Flange or body 6 of this casing is concentric with core 1 and extends toward the other end thereof.

The core is reduced at its other end to provide a neck 7 upon which is mounted a disc 8 which is formed of highly magnetic material, such as soft iron or a suitable steel. This disc is secured upon neck 7 by turning over the outer end of the neck to provide a bead 9. This bead cooperates with shoulder 10 of the core for tightly securing the disc in position upon the core.

A plate 11, preferably of a non-magnetic material, such as brass, is disposed about neck 2 of the core at the outer face of head 5 of casing 4. The outer end of neck 2 is turned over to provide a bead 12 which coacts with shoulder 3 for tightly securing the plate 11 and head 5 on the core. If desired, neck 2 may be exteriorly threaded, head 5 and plate 11 being screwed onto this neck the outer end of which is then rolled over to provide the bead 12. It is not essential, however, that the plate and the head of the casing be screwed onto neck 2 which may be threaded or not, as desired, and depending upon conditions. I also contemplate threading neck 7 and screwing disc 8 onto this neck, if this seems desirable at any time.

A plate 13, similar to plate 11, is disposed adjacent the outer face of disc 8, but spaced an appreciable distance therefrom. The plates 11 and 13 are secured together by means of screws 14 which pass through ears 15 of the plate and screw into the ends of spacing members or pillars 16 having reduced terminal elements 17 which fit into openings punched in ears 15. Plate 13 is provided with an outwardly projecting and outwardly tapering central element 18 having at its outer end a flange 19 which fits into a groove in a hub 20 provided at the inner end of a supporting sleeve 21, flange 19 being swedged into the groove of hub 20.

Prior to securing disc 8 upon neck 7 of core 1, coil 22 is placed about the core and within casing 6. This coil fits tightly about core 1 and is tightly clamped betwen head 5 and head 8. The disc, being of less diameter than the interior diameter of casing 4, defines with the adjacent edge portion of body 6 of the casing, an annular air gap 23 which is concentric with casing 4. I thus provide a cylindrical stator within which the coil is disposed, this stator having an annular air gap defined by the adjacent edge portions of casing 4 and disc 8, such portions constituting the terminal elements of the metal portion of the path of flow of the magnetic flux of the coil.

The inner edge portion of body 6 of casing 4 is serrated to provide a plurality of projecting elements, in the form of teeth 24. The slots separating these teeth preferably correspond in width to the width of the teeth and the depth of these slots is somewhat greater than the width of the teeth. Disc 8 is also provided, at its periphery, with a plurality of teeth 25 which preferably correspond in width and spacing to the teeth 24 of casing 4. There may be considerable variation in the number as well as size and spacing of the teeth either on the casing or on the disc, and it is not essential that both the disc and the casing be serrated or toothed, as one only of these members need be toothed. I have found, however, that very satisfactory results are obtained by providing both the casing and the disc 8 with an equal number of teeth which correspond in width and spacing.

Core 1 is of tubular construction, the bore thereof being of stepped formation and decreasing in diameter from neck 12. A bearing ring 26 is mounted in the intermediate portion of the bore of core 1 and is secured against axial movement therein by a screw plug 27 screwed into the largest portion of the bore of core 1, through neck 2. Sleeve 21 has the outer end portion of its bore of stepped formation and receives a bearing ring 28 secured in position between an interior shoulder in the sleeve and a screw plug 29 which screws into the outer end of the sleeve. A rotor shaft 30 is rotatably mounted in the bearing collars 26 and 28 by means of reduced end trunnions 31. A pinion 32 is secured on shaft 30 and is adapted for mesh with a gear to be driven thereby, sleeve 31 being provided with a slot 33 to accommodate such a gear.

A rotor 34 is secured on shaft 30 in any suitable manner, as by being pressed thereon. This rotor comprises a disc 35 formed of a suitable non-magnetic material. A plurality of pins 36 are secured in the disc 34 and project inwardly therefrom into the air gap 23. These pins preferably correspond in number and spacing to the teeth of disc 8 and casing 4, though this is not essential as the number of pins can be varied within wide limits. The speed of the rotor, in R. P. M. is determined by the formula $$S=\frac{120F}{P}$$

where F is the frequency of the alternating current supply and P corresponds to the number of cooperating pairs of stator polar projections or teeth.

As stated, it is not essential that the rotor have the same number of pins as there are polar projections, as by making the number of pins in the rotor any sub-multiple of the cooperating pairs of stator polar projections, the formula still holds good. In fact, it is possible to remove any number of the pins of the rotor, down to the last pin, without altering the formula. By making the number of pins in the rotor less than and prime to the number of cooperating pairs of stator projections the speed of the rotor may be reduced. In this case the formula becomes $$S=\frac{120F}{PR},$$

where R is the number of pins in the rotor prime to P. While such construction is conducive to quite low speed, a motor in which the number of pins in the rotor is appreciably less than the number of stator polar projections is generally less quiet in operation than when the pins in the rotor are equal in number to the cooperating pairs of stator polar projections. This is probably due to some slight inaccuracy in balance of the rotor. By employing a greater number of pins, the vibrations due to any inaccuracy in balance of the rotor is greatly reduced or eliminated with the result that the motor is practically noiseless in operation. A further advantage of employing the same number of pins in the rotor as there are pairs of polar projections in the stator is that this construction results in higher torque than is possible with any other combination of pins and polar projections.

By my constructon above set forth, I render it possible to provide a large number of poles within a comparatively small space, which gives high torque and low synchronous speed, which are desirable characteristics of motors of this type.

In the particular motor illustrated, I employ 48 poles, that is, 48 teeth or projections on casing 4 and on disc 8, and use 48 pins on the stator which, with a 60 cycle alternating current gives a speed of 150 R. P. M. in accordance with the above stated formula.

The pins 36 of the rotor are disclosed as spaced an appreciable distance from the teeth of the casing and the teeth of the disc 8. In practice the diameter of the pins should be such as to practically span the air gap between the aligned projections or teeth of casing 4 and discs 8, only such clearance being provided as is essential for mechanical considerations. In the operation of the motor, when coil 22 is connected into an alternating current circuit, by means of the leads 22ª provided for this purpose, a magnetic circuit is set up through the stator, this circuit including the air gap 23. The relatively great reluctance of this air gap to flow of the magnetic flux is an important feature in the operation of the motor. This motor is not self-starting and it is necessary, therefore, to turn the rotor by hand when starting the motor. When the pins 36 are disposed in alignment with the spaces 24ª and 25ª between the teeth 24 and 25 of casing 4 and discs 8, respectively, the reluctance of the magnetic circuit of the stator is a maximum. As the pins approach alignment with the pairs of teeth or polar projections of the disc 8 and casing 4, the reluctance of the air gap decreases, and when the coil 22 is energized serves to pull the rotor in the direction in which the pins 36 are effected by the magnetic flux.

The motor operates in accordance with the known theory of reaction motors, and when the rotor is brought up to its proper operating speed in accordance with the above stated formula, it will lock into step with the rotating fields created, and will thereafter run synchronously with considerable torque.

In Figure 4, I have illustrated a modified form of rotor. This form comprises a disc 37 of a suitable non-magnetic material into which is set a collar 38 of a magnetic material, the inner edge of this collar being serrated to provide teeth 39 corresponding to pins 36 of the rotor of Figures 2 and 3. The disc 37 may conveniently be formed of a condensation product molded into shape, such disc being molded about the collar 38. The disc may be secured on the rotor shaft in any suitable manner, as by being molded thereon, or secured thereto by any other known means. A rotor constructed in this manner operates in the same manner as the rotor of Figures 2 and 3, the rotor being so disposed that the teeth 39 thereof extend into the air gap 23.

The motor illustrated in Figures 1, 2, and 3 is not self-starting. This motor can be rendered self-starting, however, by providing a disc 40 of a non-magnetic material (Figure 5) and which is a good conductor of electricity, disposed between an inner disc 41 and an outer disc 42 secured on neck 7 of the core, these discs replacing the disc 8 of Figure 2. Discs 41 and 42 are formed of magnetic material, and are toothed in the same manner as disc 8, the teeth of the outer disc 42 being disposed slightly in advance of the teeth of the inner disc 41 in relation to the direction of rotation of the rotor, it being considered in this figure that the rotor turns in a clockwise direction.

When the circuit through coil 22 is closed, Foucault or eddy currents are set up in the copper disc 40 and create a strong shifting magnetic field in the annular air gap 23, it being understood that the discs 41 and 42 are disposed in the same relation to the adjacent end of body 6 of casing 4, as disc 8 in Figure 2. This shifting magnetic field is closely analogous to a rotating magnetic field and acts upon the elements of the rotor which project into the air gap in such manner as to cause rotation thereof under sufficient torque to bring the rotor up to proper speed where it will lock magnetically into step and run synchronously. By reversing the relation between the teeth of the discs 41 and 42, that is, by disposing the teeth of disc 42 in advance of the teeth of disc 41, in the opposite direction to that illustrated in Figure 5, the direction of rotation of the rotor will be reversed in accordance with well established principles. In self-starting motors the teeth of projections of the casing 4 may be made of less depth or, in some instances, may be entirely dispensed with.

What I claim is:—

1. In an electric motor of the character described, a stator comprising a core and a cup-shaped casing secured to the core and having close magnetic coupling therewith, the core and the casing being of magnetic material, a coil disposed about the core and within the casing with one end adjacent the casing head, a disc of magnetic material disposed adjacent the other end of the casing and spaced therefrom, said disc having close magnetic coupling with the core, the disc having spaced projections extending toward the casing and spaced therefrom, said projections and the adjacent end of the casing defining an annular air gap, and a rotor comprising a non-magnetic support and a plurality of magnetic elements carried thereby and projecting into said air gap.

2. In an electric motor of the character described, a substantially cylindrical stator of magnetic material comprising a core and end heads closely coupled magnetically to the core, said stator having an air gap therein concentric with the core and being provided with spaced elements disposed adjacent and substantially in the plane of the air gap, a coil disposed within the stator, and a rotor comprising a non-magnetic support and a plurality of magnetic elements carried thereby and projecting into said air gap.

3. In an electric motor of the character described, a stator comprising a core, a cup-shaped casing secured thereon at one end, said core and casing being of magnetic material, a disc of magnetic material secured on the core at the other end of the casing and spaced therefrom, the disc and the adjacent end of the casing defining an annular air gap, the stator having spaced elements disposed substantially in the plane of said gap, a coil disposed about the core and within the casing, and a rotor comprising a non-magnetic support and a plurality of magnetic elements carried thereby and projecting into the air gap.

4. In an electric motor of the character described, a substantially cylindrical stator of magnetic material comprising a body and end heads magnetically coupled thereto, said stator having a concentric air gap and being provided with spaced elements disposed adjacent and substantially in the plane of the air gap, a coil disposed within the stator and having magnetic coupling therewith, and a rotor comprising a non-magnetic support and a plurality of magnetic elements carried thereby and projecting into said air gap.

5. In an electric motor of the character described, a magnetic core, a cup-shaped casing of magnetic material secured on the core, a disc of magnetic material secured on the core and disposed within the open end of the casing in concentric spaced relation thereto, a coil mounted about the core and within the casing, the adjacent terminal elements of the metallic path of flow of the magnetic flux through the stator structure defining an annular air gap, one of said elements being provided with spaced projections disposed substantially in the plane of said gap, and a rotor comprising a non-magnetic support and a plurality of magnetic elements carried thereby and projecting into said air gap.

6. In an electric motor of the character described, a magnetic core, a cup-shaped casing secured on said core, said casing being of magnetic material, a disc of magnetic material secured on the core within the open end of the casing and in concentric spaced relation thereto, a coil mounted about the core and within the casing, the periphery of the disc being toothed and the adjacent edge portion of the casing being similarly toothed, and a rotor comprising a non-magnetic support and a plurality of magnetic elements carried thereby and projecting between the disc and the adjacent edge portion of the casing.

7. In an electric motor of the character described, a frame comprising front and back plates secured together in spaced relation, a core of magnetic material secured to the back plate, a cup-shaped casing of magnetic material secured about the core and between the same and the back plate, a disc of magnetic material secured on the core within the open end of the casing and in concentric relation thereto, said disc being of less diameter than the interior diameter of the casing and defining with the adjacent edge portion thereof an annular air gap, the periphery of the disc being toothed, a supporting sleeve carried by the front plate, a rotor shaft rotatably mounted in said sleeve and in the core, a coil disposed about said core and within the casing, and a rotor secured on said shaft and comprising magnetic elements extending into the air gap.

8. In an electric motor of the character described, a substantially cylindrical stator of magnetic material comprising a cup-shaped casing and a disc mounted at the open end of the casing in spaced relation thereto and defining therewith an annular air gap, the disc and the adjacent edge portion of the casing being provided with teeth corresponding in width and spacing, a coil disposed within the stator, and a rotor comprising magnetic elements extending into said air gap.

9. In an electric motor of the character described, a substantially cylindrical stator of magnetic material comprising a cup-shaped casing and a disc disposed within one end of the casing in concentric spaced relation thereto and defining therewith an annular air gap, a coil disposed within the casing between the other end thereof and the disc, the periphery of the disc being serrated to provide a plurality of radially projecting teeth and the adjacent edge of the casing also being serrated to provide a plurality of teeth, the teeth of the disc and the teeth of the casing being similar in width and spacing and disposed in alignment, and a rotor comprising a plurality of magnetic elements projecting into said air gap, the elements of the rotor corresponding in number and spacing to the teeth of the disc.

10. In an electric motor of the character described, a rotor comprising a disc of non-magnetic material, and a collar set into the disc and provided with a plurality of axially projecting magnetic elements.

11. In an electric motor of the character described, a rotor comprising a disc of non-magnetic material, and a collar of magnetic material set into the disc at one side thereof, said collar being serrated to provide a plurality of spaced axially projecting magnetic elements.

12. In an electric motor of the character described, a stator element comprising two discs of magnetic material and a third disc of non-magnetic material of high electrical conductivity secured between the two magnetic discs.

13. In an electric motor of the character described, a stator element comprising two discs of magnetic material and a third disc of non-magnetic material of high electrical conductivity secured between said two discs, the two magnetic discs having their peripheral portions serrated to provide radially projecting teeth.

14. In an electric motor of the character described, a stator element comprising two outer discs of magnetic material and an inner disc of non-magnetic material and high electrical conductivity secured between the outer discs, the outer discs having their peripheral portions serrated to provide spaced radially projecting teeth and the teeth of said outer discs being disposed out of alignment.

15. In an electric motor of the character described, a stator comprising, a core, a cup-shaped casing member secured to the core and having close magnetic coupling therewith, and a disc member of magnetic material disposed adjacent the other end of the casing member, said disc member having close magnetic coupling with the core, the core and the casing member being of magnetic material, a coil disposed about the core and within the casing member with one end adjacent the head thereof, one of said members being provided with projections extending toward and spaced from the other member, and a rotor provided with elements disposed outwardly of and adjacent said other member to be acted upon by the magnetic flux incident to energizing of the coil by an alternating current for rotating said rotor.

16. In an electric motor of the character described, a stator comprising, a cup-shaped casing member of magnetic material, a core of magnetic material having close magnetic coupling with the head of the casing member and a disc member of magnetic material disposed adjacent the other end of the casing member and having close magnetic coupling with the core, one of said members being provided with spaced projections extending toward and spaced from the other member, and a rotor adjacent the disc member and provided with elements extending inwardly of the stator substantially axially thereof and disposed outwardly of and adjacent said other member to be acted upon by the magnetic flux incident to energizing of the coil by an alternating current for rotating said rotor.

17. In an electric motor of the character described, a stator comprising a cup-shaped casing member of magnetic material, a core of magnetic material secured at one end to the head of the casing member and a disc member of magnetic material secured upon the other end of the core member adjacent the other end of the casing member, one of said members being provided with spaced projections extending toward and spaced from the other of said members, and a rotor adjacent the disc member and provided with elements extending inwardly of the stator substantially axially thereof and disposed outwardly of and adjacent said projections to be acted upon by the magnetic flux incident to energizing of the coil by an alternating current for rotating said rotor.

18. In an electric motor of the character described, a stator comprising, a cup-shaped casing member of magnetic material, a core of magnetic material having close magnetic coupling with the head of the casing member and a disc member of magnetic material disposed adjacent the other end of the casing member and having close magnetic coupling with the core, one of said members being provided with spaced projections extending toward and spaced from the other member, and a rotor adjacent the disc member and provided with magnetic elements extending inwardly of the stator substantially axially thereof and disposed outwardly of and adjacent said projections.

19. In an electric motor of the character described, a stator comprising a cup-shaped casing member of magnetic material, a core of magnetic material secured at one end to the head of the casing member and a disc member of magnetic material secured upon the other end of the core member adjacent the other end of the casing member, one of said members being provided with spaced projections extending toward and spaced from the other of said members, and a rotor adjacent the disc member and provided with magnetic elements extending inwardly of the stator substantially axially thereof and disposed outwardly of and adjacent said projections.

20. In an electric motor of the character described, a stator comprising, a cup-shaped casing member of magnetic material, a core of magnetic material having close magnetic coupling with the head of the casing member and a disc member of magnetic material disposed adjacent the other end of the casing member and having close magnetic coupling with the core, one of said members being provided with spaced projections extending toward and spaced from the other member, and a rotor provided with magnetic elements extending inwardly of the stator substantially axially thereof and disposed outwardly of and adjacent one of said members to be acted upon by the magnetic flux incident to energizing of the coil by an alternating current for rotating said rotor.

21. In a synchronous motor, a stator comprising two annular elements of magnetic material concentrically disposed and comprising portions in closely spaced relation and adapted to have an alternating flux field created therebetween, projections on one of said portions forming polar members in said flux field, means forming a magnetic circuit between said stator elements and including a coil adapted to create said alternating flux field when energized by an alternating current, and a rotor coacting with said flux field.

In witness whereof, I hereunto subscribe my name this 5th day of November, A. D., 1930.

FREDERICK C. HOLTZ.